(No Model.)

J. H. & T. J. PORTE.
BROOCH.

No. 363,761. Patented May 24, 1887.

Witnesses
F. B. Fcheushenhaugh
J. M. Jackson

Inventors.
James H. Porte
Thos. J. Porte
by Donald C. Ridout
Atty

United States Patent Office.

JAMES H. PORTE AND THOMAS J. PORTE, OF PICTON, ONTARIO, CANADA.

BROOCH.

SPECIFICATION forming part of Letters Patent No. 363,761, dated May 24, 1887.

Application filed March 11, 1887. Serial No. 230,747. (No model.)

*To all whom it may concern:*

Be it known that we, JAMES HENRY PORTE and THOMAS JEFFARES PORTE, both of the town of Picton, in the county of Prince Edward, in the Province of Ontario, Canada, have jointly invented a certain new and useful Improvement in Brooches, of which the following is a specification.

The object of the invention is to design a hinge or joint by which the brooch-pin may be readily connected and detached, so that any lady may replace a broken pin without employing an artisan; and it consists, essentially, in forming a head on the end of the brooch-pin to fit into a socket attached to the brooch at the point where the hinge is usually placed, the said pin being held in the socket by a cap screwed onto the socket and having a hole or slot made in it, to permit the pin to move as on a hinge, substantially as hereinafter more particularly explained.

Figure 2:
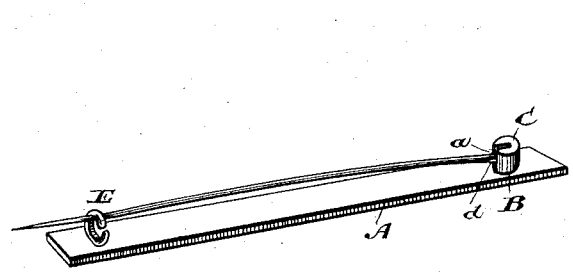
Figure 1:
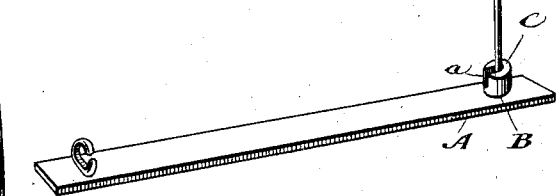
Figure 3:
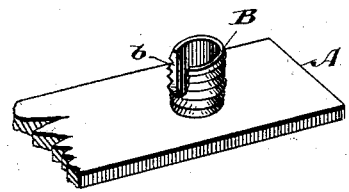
Figure 5:
Figure 4:
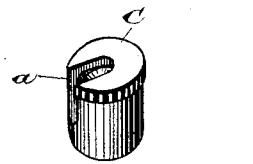

Figure 1 is an inside view of the brooch, showing the pin in the position it will stand while it is being connected to or disconnected from the brooch. Fig. 2 is a view of the brooch showing the pin in its normal position. Fig. 3 is an enlarged view of a portion of the brooch, showing the hinge-socket. Fig. 4 is an enlarged view of the cap for securing the pin to the hinge. Fig. 5 is an enlarged view of the pin, showing its head.

A represents the body of the brooch, and B the hinge-socket, which is attached to the brooch A at the point indicated. This socket B has a screw cut on it to receive the screw-threaded cap C.

D is a head formed on the end of the pin. A hole is made in the head of the cap C sufficiently large to permit the pin to pass through, but small enough to prevent the head D from passing through. A slot, $a$, is made in the cap C, corresponding in size substantially with the hole referred to, so that the pin may move as on a hinge. A slot, $b$, may also be made in the socket B.

Although the pin will work admirably with merely a head, D, formed on it, we sometimes place on one side of the pin a small rib, $d$, which fits into the slot, and, by coming in contact with the side of the socket B before the pin reaches the hook E, causes the said pin to spring when pressed to reach the said hook E.

In order to remove the pin it is merely necessary to stand it up on its head, as indicated in Fig. 1, when the cap C may be unscrewed from the socket B. The old pin may then be removed and be replaced by a new one, the operation being so simple that any lady may accomplish the work herself.

What we claim as our invention is—

1. A brooch-pin having a head, D, formed on it to fit into a socket, B, attached to the brooch A, in combination with the screw-threaded cap C, arranged substantially as and for the purpose specified.

2. A brooch-pin having a rib, $d$, and a head, D, formed on it to fit into a socket, B, attached to the brooch A, in combination with the screw-threaded cap C, arranged substantially as and for the purpose specified.

3. A brooch-pin having a head, D, formed on it to fit into a socket, B, attached to the brooch A, in combination with the screw-threaded cap C, having a slot, $a$, made in it, substantially as and for the purpose specified.

4. A brooch-pin having a head, D, formed on it to fit into the socket B, attached to the brooch A, and a slot, $b$, made in the said socket, in combination with the cap C, having a slot, $a$, made in it, substantially as and for the purpose specified.

Picton, March 8, 1887.

JAS. H. PORTE.
                    T. J. PORTE.

In presence of—
    C. H. WIDDIFIELD,
    J. ROLAND BROWN.